Oct. 11, 1932.  S. M. ANDERSON ET AL  1,881,992
AIR CONDITIONING CONTROL
Filed May 9, 1931  3 Sheets-Sheet 3

INVENTORS.
S. M. ANDERSON,
BY ROBERT T. PALMER,
ATTORNEYS.

Patented Oct. 11, 1932

1,881,992

UNITED STATES PATENT OFFICE

SAMUEL M. ANDERSON, OF SHARON, MASSACHUSETTS, AND ROBERT T. PALMER, OF NEW YORK, N. Y., ASSIGNORS TO B. F. STURTEVANT COMPANY, OF BOSTON, MASSACHUSETTS

AIR CONDITIONING CONTROL

Application filed May 9, 1931. Serial No. 536,144.

This invention relates to methods and apparatus for controlling the vapor content of fluids and relates more particularly to methods and apparatus for controlling the relative humidity of the air within an enclosure.

It is becoming better and better known that living conditions in heated rooms are greatly improved when the air within the rooms contains a substantial amount of moisture or water vapor which tends to prevent the drying of the nasal and throat passages of the occupants. This moisture also tends to prevent the circulation of dust, which in itself is undesirable and may be injurious. Also, in certain manufacturing processes, among which are the manufacture of paper and the manufacture of cloth, the presence of a certain amount of moisture is necessary in the air in which the processes are employed. The heating systems generally employed for heating buildings effectively reduce the relative amount of moisture in the air so that it has been found desirable to provide humidifying apparatus for introducing additional moisture to compensate for the loss of relative humidity through the heating process.

A relative humidity of from fifty (50%) to fifty-five (55%) percent is in many cases desirable, but in cold weather and especially in extremely cold weather, such a high degree of moisture in the air of a closed room is attended by a serious disadvantage, in that a low outdoor temperature chills the window panes of the room, causing the moisture in the air of the room to condense thereon, and if this condensation is excessive, the window pane becomes frosted or clouded and the view is obscured. In many cases it may be desirable that the moisture content of the air in a room be as high as possible without producing this condensation of the moisture on the window surface, but due to the wide range of outdoor temperatures during the winter months, and the resulting difference in temperature between the heated air in the room and the outside air, the relative amount of moisture which can be supplied to the room without causing condensation will correspondingly vary within wide limits.

An object of the invention is to control the vapor content of a fluid.

Another object of the invention is to automatically control the supply of moisture to the air within a room, by observation of the conditions which would cause the condensation of moisture from the air on a surface exposed to a lower temperature than that existing within the room.

Another object of the invention is to prevent the condensation of moisture upon the window pane of a room.

Another object of the invention is to automatically control the supply of moisture to the air within a room having a surface exposed to outside temperatures, by observation of the wet bulb and dry bulb temperatures within the room, and the temperature of the air outside the room.

Another object of the invention is to automatically control the supply of moisture to the air within a room by holding the dew point of the room just under the inside temperature of a surface exposed on one side to the room temperature and on the other side to the outside air.

It is well known that when air contains moisture this moisture will be precipitated if the air is cooled to a sufficiently low temperature known as the dew point. The moisture from the air which condenses upon the inner surface of the window pane is precipitated by the air in contact with and adjacent to the window pane being cooled by the relatively cold window pane to its dew point. Obviously, the greater the amount of moisture in the air of a room, the higher the temperature at which it will precipitate upon the window pane, and the less the amount of moisture, the lower the temperature at which the moisture will precipitate. Since a room, the air of which it is desired to humidify, ordinarily has one or more windows exposed to the outside air, the relative humidity of the air within the room cannot be held at a constant value when outside temperatures change. It is desirable to have a constant relative humidity and a constant temperature within a room, but it is undesirable to have the window panes of the room become clouded up by the condensation of the moisture from the conditioned air. It has, therefore, been necessary to reduce the relative humidity of the air within a room as the outside temperature drops in order to prevent condensation on the window panes of the room. This invention provides methods and apparatus for automatically controlling the relative humidity of the room as outside changes of temperature occur to hold the relative humidity as high as is possible without the condensation of the moisture upon the window panes.

In one embodiment of the invention, analyses are made of the wet bulb and dry bulb temperatures of the air within the room and of the outside temperatures and control apparatus is actuated to prevent the amount of moisture in the air in the room from becoming so great that the dew point of the air at the window pane becomes the same as, or approaches closely the inside temperature of the window pane. Experiments were made to determine for a given range of outside temperatures, the wet bulb and dry bulb temperatures within the room at which condensation would occur for each outside temperature, while holding the relative humidity as high as practicable. It was found that for each value of outside temperature, moisture would condense on the window pane of the room at a certain wet bulb temperature or higher temperature and at a certain dry bulb temperature or lower temperature. The wet bulb temperature control apparatus comprises a wet bulb thermocouple placed within the room to generate electro-motive forces proportional to the wet bulb temperatures of the air within the room, a dry bulb thermocouple arranged within the room to generate electro-motive forces proportional to the dry bulb temperature within the room, a pair of dry bulb thermocouples placed without the room exposed to the outside air to generate electro-motive forces proportional to the temperature of the outside air and a differentially wound galvanometer having its moving coil adapted to actuate control apparatus to control the humidifier supplying the moisture to the room. One differential coil of the galvanometer is connected to one of the thermocouples outside the room and the other differential coil of the galvanometer is connected to the thermocouple which is responsive to wet bulb temperatures within the room. The windings of the differential coils are so arranged and the electro-motive forces generated by the thermocouples are adjusted so that when the wet bulb temperature of the air within the room, increases above a predetermined condensation level at a given outside temperature, the magnetic fields set up around the two differential coils are such that the moving coil maintains its pointer against the contact which actuates control circuits to shut off the humidifier. The direction of rotation of the moving coil is arranged with respect to the magnetic field set up by the differential coils so that the control contacts are kept closed when higher wet bulb temperature or a lower outside temperature is reached, but to open the contacts when the wet bulb temperature is too low to cause the precipitation of moisture at a given outside temperature.

The dry bulb temperature control apparatus comprises two galvanometers, one having its moving coil connected to the other of the thermocouples outside the room and the other having its moving coil connected to a dry bulb thermocouple inside the room. The moving coil of the galvanometer, associated with the thermocouple placed outside the room, carries a pointer which contacts with a resistance which is carried by the moving coil of the galvanometer associated with the dry bulb thermocouple inside the room. The pointer and the resistance are connected in a relay circuit and are so adjusted that when the dry bulb temperature drops for a given outside temperature below a predetermined condensation level, increased resistance is inserted in the relay circuit, causing its armature to fall back, causing the circuit to shut off a valve in the humidifier water supply. When the dry bulb temperature is above the predetermined condensation level for a given outside temperature, the two galvanometer coils move relative each other to decrease the amount of resistance in the relay circuit, causing it to pull up its armature and turn on the valve in the humidifier water supply.

The wet bulb temperature control and the dry bulb temperature control act jointly to control the operation of the humidifier. The humidifier is off when either the wet bulb or the dry bulb temperature control act to shut off the humidifier, but is on only when both the controls act to turn the humidifier on.

In another embodiment of the invention a thermocouple responsive to wet bulb temperatures is placed adjacent a window pane or other surface exposed to outside temperatures, and a portion of the air within the room is passed in contact with the window pane so as to be cooled thereby to a wet bulb temperature corresponding to the temperature of the window pane. A thermocouple responsive to dry bulb temperatures is mounted in the window pane, in contact with the window pane, or exposed to the outside air to generate electro-motive forces proportional to the temperature of the window pane. It is known that the moisture in air precipitates only when its dew point is reached and that the dew point is the point where the wet bulb temperatures of the air and the dry bulb temperatures of the air are exactly equal. This is the condition when moisture condenses on the window pane of a room. When the wet bulb temperature of the air immediately adjacent the window pane is equal to the temperature of the window pane, moisture condenses. The wet bulb thermocouple in this embodiment of the invention is made responsive to the wet bulb temperature of the air immediately adjacent the window pane and the dry bulb thermocouple is made responsive to the temperature of the window pane. The two thermocouples are so connected to control apparatus that when the wet bulb temperatures and the dry bulb temperatures are substantially the same, control apparatus is actuated to shut off the humidifier until such time as the wet bulb temperature of the air immediately adjacent the window pane becomes less than the temperature of the window pane. This is done by causing the electromotive forces generated by the two thermocouples to oppose each other so that when they are substantially equal, contacts are closed in a control circuit to actuate control apparatus to shut off the humidifier or to decrease the amount of moisture supplied to the air within the room.

The invention will now be explained with reference to the drawings, of which.

Figure 7:
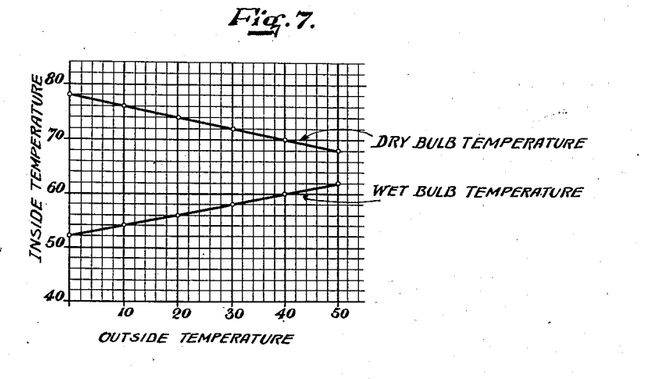
Fig. 7 is a chart having plotted thereon the wet bulb temperatures and the dry bulb temperatures for given values of outside temperatures at which the control circuits shown by Figs. 1 and 2 would become actuated, to decrease the amount of moisture supplied to the air within a room.

The co-ordinate of the curves on the chart of Fig. 7 were chosen from a psychrometric chart and adjusted to meet actual working condition through knowledge gained from actual working tests. When the wet bulb and dry bulb temperatures are maintained on the curves of this chart for given values of outside temperature, the highest possible values of relative humidity are maintained within the room without condensation appearing upon the window pane. Of course, the relative humidities are low at low outside temperatures but this is a condition which cannot be avoided since with the present design of human habitations it is impossible to have relatively high humidities within a room with windows exposed to very low outdoor temperatures without moisture condensing upon the window panes.

An inspection of the chart of Fig. 7 shows that at 50° outside temperature a wet bulb temperature of 62° and a dry bulb temperature of 68° may be maintained without the condensation of moisture on the window pane. At zero degrees outside temperature, the desirable dry bulb temperature is 78° and the desirable wet bulb temperature is 52°. An inspection of the slope of the curves shows that for an increase of 50° outside temperature, an increase of 10° wet bulb temperature and a decrease of 10° dry bulb temperature is permissible. The wet bulb temperature increases 10° while the outside temperature increases 50° and as the rate of increase is constant, it is seen that an increase of 2° of wet bulb temperature for each 10° of outside temperature is permissible. Likewise, a decrease of 10° dry bulb temperature is shown for an increase of 50° outside temperature, this rate of decrease of dry bulb temperature being 2° for each 10° of outside temperature. It is seen, therefore, that the rate of increase of wet bulb temperature to outside temperature is one to five and that the rate of decrease of dry bulb temperature to increase of outside temperature is one to five. Bearing in mind these relative changes of dry bulb and wet bulb temperatures, the operation of the apparatus shown by Figs. 1 and 2 will now be explained.

Figure 1:
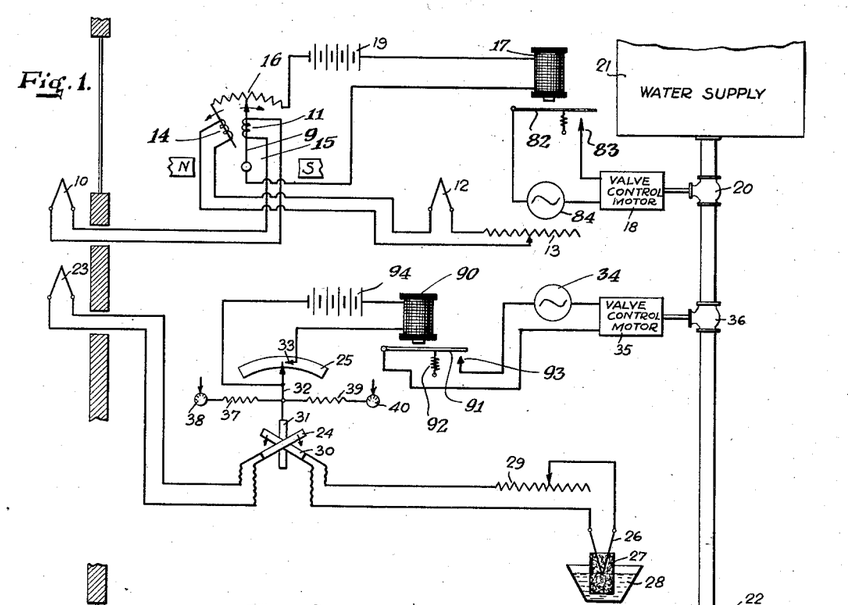
Fig. 1 is a diagrammatic view of control apparatus for decreasing the amount of moisture added to the air within the room when certain dry bulb and wet bulb temperatures are reached corresponding to certain outside temperatures.
Figure 2:
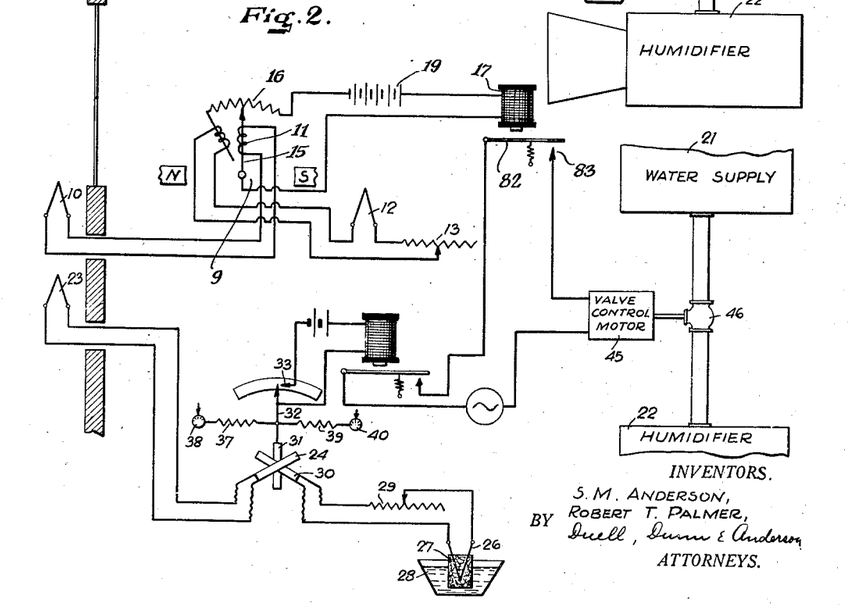
Fig. 2 is a diagrammatic view similar to Fig. 1 except that whereas in Fig. 1 separate humidity controls are provided for the wet bulb and dry bulb thermocouples, in Fig. 2 the two thermocouples co-operate to actuate a single control apparatus.

The dry bulb thermocouple 10 is placed outside the room in which the air is humidified and generates electro-motive forces proportional to outside temperatures. The electro-motive forces thus generated are fed into the moving coil 11 of the galvanometer 9 which has two moving coil armatures 11 and 14. The thermocouple 12 is arranged within the room and is responsive to the dry bulb temperature of the air within the room. The electro-motive forces generated by this thermocouple are responsive to the dry bulb temperature of the room and are fed through the resistance 13 into the other moving coil 14 of the galvanometer. The armature 11 carries the pointer 15 and the armature 14 carries the resistance 16, the pointer 15 and the resistance 16 contacting with each other and being so arranged that the amount of resistance in an electrical circuit including the pointer 15, the resistance 16, the battery 19, and the relay 17 is decreased when the moving coils 14 and 11 move in opposite directions away from each other, and is increased when they move towards each other. The armature 82, when the relay is de-energized, is adapted to fall back and close a circuit, including the armature 82, the contact 83, the alternating current source 84, and the valve control motor 18, to cause the valve control motor to operate to close the valve 20 and to shut off the supply of water from the water supply 21 to the humidifier 22. The two armatures of the galvanometer 9 are so arranged with respect to each other that when the dry bulb temperature affecting the thermocouple 12 is at a predetermined value or lower with respect to the temperature affecting the thermocouple 10, responsive to the outdoor temperatures, the amount of the resistance 16 in the circuit of the relay 17 is too great for the relay to be sufficiently energized to pull up its armature 82 so that the humidifier remains shut off. When the temperature affecting the dry bulb thermocouple 12 is above its predetermined value with respect to a given outside temperature affecting the thermocouple 10, the galvanometer coils 11 and 14 move away from each other, decreasing the amount of resistance in the relay circuit, energizing the relay, causing it to pull up its armature 82, to open the circuit of the valve control motor 18, and to open the valve 20 in the humidifier water supply.

The two moving coils 11 and 14 of the galvanometer 9 are wound in opposite directions so that while an increase in current in the moving coil 11 causes it to move to the right in the direction indicated by its associated arrow, an increase in current through the moving coil 14 causes it to move to the left as indicated by its associated arrow. As a result, assuming a constant outdoor temperature which would cause the pointer 15 to remain stationary, an increase of the dry bulb temperature within the room would cause the thermocouple 12 to generate increased currents, causing the moving coil 14 to move to the left and so move the resistance 16 with respect to the pointer 15, that less resistance is in the circuit of the relay 17, so that increased current flows therethrough to energize same. Then, assuming a constant dry bulb temperature within the room, the moving coil 14 and its associated resistance 16 would remain stationary. Then, as the outside temperature affecting the thermocouple 10 increases, the moving coil 11 moves to the right carrying with it the pointer 15 which moves relative the resistance 16 to decrease the resistance in the relay 17 and increase the current flowing therethrough to energize the relay to cause the humidifier to be turned on. A decrease in the dry bulb temperature in the room, if the outside temperature remains constant, or a decrease in the outside temperature while the dry bulb temperature remains constant, causes the amount of resistance in the circuit of the relay 17 to become greater, causing a decrease of current through the relay winding to de-energize it sufficiently to permit the armature 82 to fall back to close the circuit of the valve control motor 18 to cause it to shut off the humidifier.

Since the dry bulb temperature control apparatus is designed to operate to shut off the humidifier when the dry bulb temperature is on or below the dry bulb temperature curve of Fig. 7, it will operate to actuate the control apparatus regardless of any fluctuation of the outside temperature or inside dry bulb temperature in either direction. To illustrate the operation, the following conditions which would be met with actual installation will be described:

1. The outside temperature increases while the dry bulb temperature inside the room remains constant. The moving coil 11 moves to the right to decrease the amount of resistance in the relay circuit, causing energization of the relay to cause the armature 82 to be pulled up to open the humidifier valve.

2. The outside temperature increases and the dry bulb inside temperature increases. The two moving coils 11 and 14 move in opposite directions to decrease the amount of resistance in the relay circuit, causing energization of the relay to cause the armature 82 to be pulled up to open the humidifier valve.

3. The outside temperature increases while the dry bulb inside temperature decreases, the temperatures remaining on the dry bulb temperature curve of Fig. 7. The increase of outside temperature causes the moving coil 16 to move to the right to tend to decrease the amount of resistance in the circuit, but the decrease of the dry bulb inside temperature causes the coil 16 to move to the left to tend to increase the amount of resistance in the circuit, the combined movement of the two coils resulting in the amount of resistance in the circuit remaining constant, this amount of resistance, as has previously been explained, being chosen as sufficient to prevent the relay 17 from being energized to pull up its armature, this resulting in the humidifier being turned off as long as the temperatures are on the dry bulb temperature curve of Fig. 7.

When the outside temperature increases or the dry bulb inside temperature decreases to throw the temperatures above or below the curve of Fig. 7, the conditions will be similar to those of other items explained herein.

4. The outside temperature decreases while the dry bulb inside temperature remains constant. The moving coil 14 moves to the right to insert more resistance in the relay circuit, causing de-energization of the relay with its armature released, to shut off the humidifier.

5. The outside temperature decreases while the dry bulb inside temperature increases to hold the temperatures on the dry bulb temperature curve of Fig. 7. The moving coil 14 moves to tend to place more resistance in the relay circuit, while the moving coil 11 moves to tend to place less resistance in the relay circuit, the degrees of movement of the two coils being the same, resulting in the resistance in the relay circuit being held the same and at the value previously described as being insufficient to energize the relay, causing the humidifier to be turned off. When the outside temperature decreases or the dry bulb inside temperature increases at rates sufficient to throw the temperatures above or below the curve of Fig. 7, the conditions will be similar to those of other of the items listed herein.

6. The outside temperature decreases while the dry bulb temperature decreases. Both of the coils 14 and 11 move to place more resistance in the relay than is necessary to de-energize it, causing the humidifier to be shut off.

7. The outside temperature remains constant while the dry bulb inside temperature increases. The moving coil 14 moves to the left to place less resistance in the relay circuit, causing it to be energized to pull up its armature and to open the humidifier valve.

8. The outside temperature remains constant while the dry bulb inside temperature decreases. The moving coil 14 moves to the right to place more resistance in the relay circuit, causing the humidifier to be shut off.

The resistance 13 in the circuit of the thermocouple 12 is adjustable to compensate for inequalities of response of the two thermocouples or for other inequalities.

The dry bulb temperature control apparatus described above actuates only to prevent the condensation of moisture on the window pane. It acts to shut off the humidifier when conditions indicate that moisture may appear on the window pane and turns on the humidifier again when the temperatures have so changed that there is no danger of moisture appearing. There is no attempt to have the control apparatus actuated for comfort purposes other than to turn on the humidifier when the danger of condensation disappears. This dry bulb temperature control apparatus co-operates with the wet bulb temperature control apparatus which will now be described.

The wet bulb temperature control apparatus comprises another dry bulb thermocouple 23 which is arranged without the room to generate electro-motive forces proportional to the outside temperature and which forces are fed into the differential field coil 24 of the galvanometer 25. The wet bulb thermocouple 26 is arranged within the wick 27 which is arranged in such position within the room that the air stream strikes against it to cause it to respond in the well known manner to wet bulb temperatures and to generate electro-motive forces proportional thereto. These electro-motive forces generated by the thermocouple 26 are led through the resistance 29 and into the differential coil 30 of the galvanometer 25. As shown by the wet bulb temperature curve of Fig. 7, the wet bulb temperatures increase from 52° to 62° while the outside temperatures increase from zero degrees to 50°. There is a 10° increase in wet bulb temperatures to a 50° increase in outside temperatures. The differential coil 30 is arranged to have five times as many ampere turns as the differential coil 24 and these coils are wound in opposite directions so that the magnetic force from the coil 24 influences the moving coil 31 of the galvanometer and opposes the magnetic force set up in the coil 30. The resistance 29 is adjusted until the force set up in the coil 30 by the thermocouple at 52° wet bulb temperature, for example, is equal to the force set up in the differential coil 24 corresponding to an outside temperature of 0 degrees. The magnetic forces set up by the coils 24 and 30 are seen to be equal and opposite as long as the wet bulb temperature within the room for a given outside temperature lies on the wet bulb temperature curve of Fig. 7. The moving coil 31 carries the pointer 32 which is just free from the contact 33, when the forces exerted by the coils 24 and 30 are equal, to open the electrical circuit through the current source 34 and the relay 90, thus de-energizing the relay 90, permitting its armature 91 to be pulled back by the spring 92 to contact with the contact 93 to close the circuit including the valve control motor 35, the current source causing the motor 35 to close the valve 36 to shut off the supply of moisture within the room when the wet bulb temperatures are on the wet bulb temperature curve of Fig. 7. When the wet bulb temperatures are higher than those on the wet bulb temperature curve of Fig. 7, it is desirable that the humidifier be shut off so that the resulting increased electro-motive forces to be set up by the differential coil 30 which cause the moving coil 31 to rotate to the left (facing the drawings) to move the pointer 32 away from the contact 33, causing the control motor 35 to keep the valve 36 closed. When the wet bulb temperatures are below the values on the wet bulb temperature curve of Fig. 7, the magnetic forces set up by the electro-motive forces through the coil 24 are greater than those set up by the coil 30 and the moving coil 31 rotates to the right and moves the pointer 32 against the contact 33, closing the electrical circuit of the relay 90, causing the relay 90 to be energized by the battery 94 to pull up its armature 91 to open the circuit of the control motor 35, causing the valve 36 to be opened, thus permitting the moisture to be supplied to the humidifier 22, if, of course, the dry bulb temperatures within the room are such that the valve 20 is open. The spring 37 has one end connected to the pointer 32 and the other end attached to the tensioning device 38, and on the opposite side of the pointer, the spring 39 has one end attached to the pointer, and the other end to the tensioning device 40. The purpose of these springs is to bias the moving coil 31 of the galvanometer in one or the other directions, to compensate for inequalities in the thermocouples 36 and 33, in the electrical circuit, or in the galvanometer itself.

The wet bulb thermocouple control apparatus described above acts to shut off the humidifier when the wet bulb temperatures are on the wet bulb temperature curve of Fig. 7 or below the curve for a given outside temperature. The following are the conditions which it is expected the apparatus will meet in actual service, with an accompanying explanation of the response of the apparatus to control the humidifier:

1. The outside temperature increases while the wet bulb inside temperature remains constant. The current through the differential coil 24 is stronger than that through the differential coil 30 so that the galvanometer coil 31 is rotated to the right against the contact 33, closing the electrical circuit of the valve control motor 35, causing it to open the valve 36.

2. The outside temperature increases while the wet bulb temperature increases to follow the curve of Fig. 7. The currents in the two differential coils are equal so that the galvanometer moving coil 31 remains in its mid-position away from the contact 33, leaving the circuit of the motor control valve open and the valve closed. If the outside temperature increases to throw the wet bulb temperature above or below the curve of Fig. 7, when the wet bulb temperature is above the curve, the force in the coil 30 is greater than the force in the coil 24 causing the armature 31 to move the pointer 32 against the contact 33, closing the circuit of the valve control motor shutting off the humidifier. If the wet bulb temperature is below the curve, the force exerted by the differential coil 24 is greater than that exerted by the coil 30, the pointer 32 is rotated away from the contact 33, and the valve control motor opens the valve 36.

3. The outside temperature increases while the wet bulb temperature decreases. The current through the coil 24 is stronger than that through the coil 30. The pointer 32 is rotated against the contact 33 to cause the valve 36 to be opened by the valve control motor 35.

4. The outside temperature decreases while the wet bulb temperature remains constant. The current through the coil 30 is greater than that through the coil 24, and the pointer 32 is rotated away from the contact 33, leaving the valve control circuit open, so that the valve control motor 35 closes the valve 36.

5. The outside temperature decreases while the wet bulb temperature increases. The current through the coil 30 is greater than that through the coil 24. The pointer 32 is rotated away from the contact 33, leaving the valve control circuit open so that the valve control motor 35 closes the valve 36.

6. The outside temperature decreases while the wet bulb temperature decreases to remain on the wet bulb temperature curve of Fig. 7. The currents in the two differential coils 24 and 30 are the same, the pointer 32 remains in its mid-position with the valve control circuit open, and the valve 36 closed. If the outside temperature decreases faster than the wet bulb temperature decreases, the current through the coil 30 will be greater than that through the coil 24, causing the pointer 32 to be rotated away from the contact 33 with the valve 36 closed. If the wet bulb temperature decreases faster than the outside temperature decreases, the current through the coil 24 will be greater than that through the coil 30, the pointer 32 will be rotated against the contact 33, the circuit of the valve control motor closes and the valve 36 is opened.

7. The outside temperature remains constant while the wet bulb temperatue increases. The current through the coil 30 is greater than that through the coil 24, the pointer 32 is rotated away from the contact 33, and the valve 36 is closed.

8. The outside temperature remains constant while the wet bulb temperature decreases. The current through the coil 24 is greater than that through the coil 30, the pointer 32 is rotated against the contact 33, the circuit of the valve control motor is closed, and the valve control motor 35 opens the valve 36.

The dry bulb control apparatus and the wet bulb control apparatus are both seen to be actuated independently to shut off the supply of water to the humidifier when the relative humidity within the room and the temperature of the window pane approach predetermined levels which have been arrived at through experience. The humidifier is shut off when either the valve 20 or the valve 36 is closed and is turned on only when both valves are opened. With these control circuits, the relative humidity of the room is maintained at as high a level as is possible, as the temperature of the window pane falls, without condensation of the moisture occuring on the window pane.

The apparatus shown by Fig. 2 is substantially the same as that shown by Fig. 1 except that a single valve control motor 45 is used to shut off a single valve 46 between the humidifier 42 and its water supply 21. Like numerals are used for like apparatus in the two figures. Instead of the contacts 82 and 83 of the dry bulb temperature galvanometer controlling one valve control motor, and the contact 33 and pointer 32 controlling a separate valve control motor, the two sets of contacts are arranged in series in a circuit including the single battery 47 and the single valve control motor 45. With this arrangement, the humidifier is shut off when the dry bulb temperatures and wet bulb temperatures appear on their respective curves of Fig. 7, or when the wet bulb temperatures occur on or above the wet bulb temperature curve and the dry bulb temperatures occur on or below the dry bulb temperature curve and the humidifier will remain in operation under all other conditions.

Figure 3:
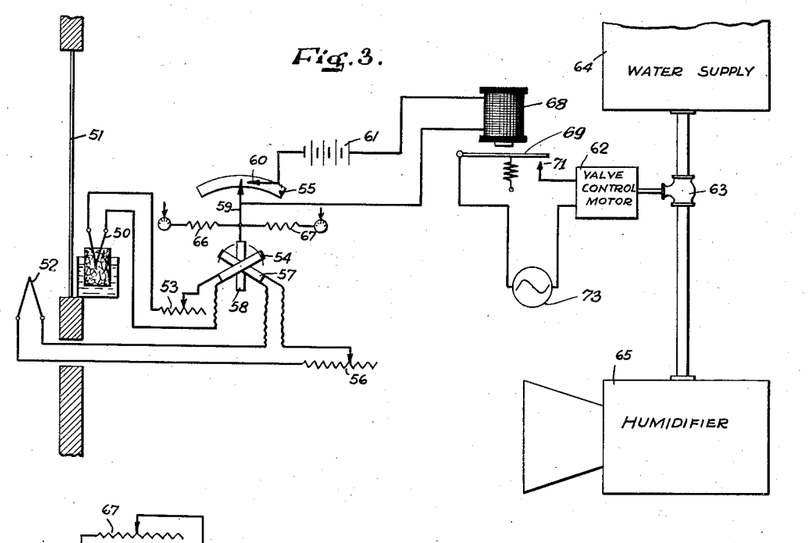
Fig. 3 is a diagrammatic view of humidity control apparatus for decreasing the amount of moisture supplied to the air within a room when the dry bulb temperature of a window pane of a room, and the wet bulb temperature of the air immediately adjacent the window pane become substantially equal.
Figure 4:
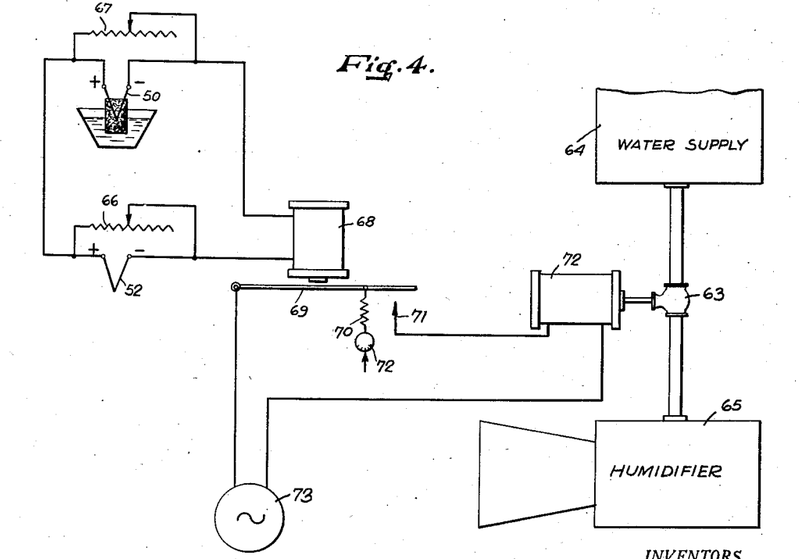
Fig. 4 is a diagrammatic view showing another form of circuit for shutting off the humidifier when the temperature of the window pane of Fig. 3 and the wet bulb temperature of the air adjacent the window pane become substantially equal.
Figure 5:
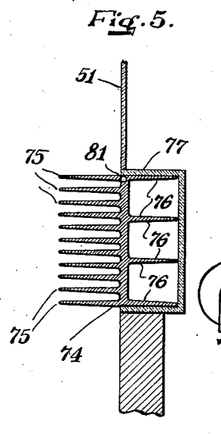
Fig. 5 is an end sectional view of a metal surface having radiative fins and air channels which may be used in the control apparatus shown by Figs. 3 and 4 for causing a wet bulb thermocouple to become responsive to temperatures proportional to the temperature of the outside air.
Figure 6:
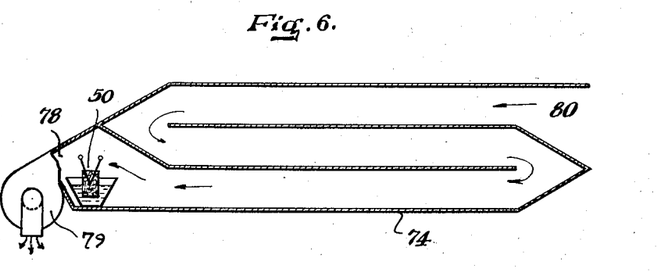
Fig. 6 is a side view showing the layout of the apparatus shown by Fig. 5 for receiving a wet bulb thermocouple.

In another embodiment of the invention, advantage is taken of the fact that moisture precipitates on the window pane when the inside temperature of the window pane is the dew point of the air within the room. The condensation occurs, therefore, only when the dry bulb and wet bulb temperatures of that portion of the air immediately adjacent and in contact with the window pane are equal. Referring now to Figs. 3, 4, 5, and 6, the control apparatus for shutting off the humidifier, when the wet bulb and dry bulb temperatures of the air at the window pane are equal, will be explained. Figs. 3 and 4 are diagrammatic views showing the layout of the control apparatus, and Figs. 5 and 6 show structures which may be used with the diagrammatic circuits of Figs. 3 and 4.

Referring now to Figs. 3 and 4, the wet bulb thermocouple 50 is so placed adjacent the inside surface of the window pane 51 that the current of air passing the thermocouple is cooled by the window pane to a wet bulb temperature proportional to the temperature of the window pane. Provision is made for passing a current of air against the wet bulb thermocouple 50 to cause it to respond to wet bulb temperatures. This arrangement is shown by Figs. 5 and 6 and will be explained later. The dry bulb thermocouple 52 is arranged to be responsive to the temperatures of the window pane or to outside temperatures which, of course, are proportional to the temperatures of the window pane. It may be mounted in the window pane or mounted outside the window pane and immediately adjacent thereto. The electro-motive forces generated by the wet bulb thermocouple 50 are led through the variable resistance 53 into the differential coil 54 of the galvanometer 55. The electro-motive forces generated by the dry bulb thermocouple 52 are fed through the variable resistance 56 into the differential coil 57 of the galvanometer. The moving coil 58 carries the indicator 59 which, when the currents through the two coils 54 and 57 are equal, remains in its zero position as shown by the drawing. This is the condition when the wet bulb temperatures and the dry bulb temperatures are substantially the same and when the moisture in that portion of air immediately adjacent the window pane is at the point of becoming precipitated. Normally, of course, the dry bulb temperature will be higher than the wet bulb temperature and the electro-motive forces generated by the thermocouple 52 will be greater than those generated by the thermocouple 50. The magnetic forces exerted by the differential coil 57 on the moving coil 58 will be greater than those by the differential coil 54, causing the pointer 59 to rest against the contact 60 which closes the electrical circuit through the battery 61 and relay 68 to open the circuit of the control motor 62 which holds the valve 63 open, permitting moisture to be supplied from the water supply 64 to the humidifier 65. When the wet bulb and dry bulb temperatures approach each other to become the same, the magnetic forces set up by the coil 54 balance out those set up by the coil 57. The moving coil 58 returns the pointer 59 to its zero position, opening the relay circuit and energizing the control motor 62 to close the valve 63, thus shutting off the supply of water to the humidifier.

It is realized that it might prove difficult to cool the wet bulb thermocouple 50 to a sufficiently low temperature to respond exactly to the wet bulb temperature of the air at the surface of the window pane, but it is a fact that the wet bulb thermocouple 50 would become cooled proportional to the temperatures of the window pane so that provision is made for adjusting the differences between the current supplied by the two thermocouples when the dew point is reached. The variable resistance 53 may be decreased and the variable resistance 56 may be increased to cause the current supplied by the wet bulb thermocouple 50 to its differential coil 54 to equal those supplied by the dry bulb thermocouple 52 to its differential coil 57 when the dew point is reached, thus compensating for the probable tendency of the wet bulb thermocouple 50 to be cooled to a temperature slightly above the temperature of the window pane, when the dew point is reached. The two adjustable biasing springs 66 and 67 which are arranged on each side of the pointer 59 may be tensioned to bias the pointer 59 to one side or the other to compensate for inaccuracies of the electrical circuits, in the thermocouples, or in the galvanometer.

Fig. 4 is a diagrammatic view of another arrangement for shutting off the humidifier when the wet bulb and dry bulb temperatures of the air immediately adjacent the surface of the window pane are equal. With this arrangement, a differential galvanometer is not used. The dry bulb thermocouple 52 has shunted across its output terminals the high resistance 66. The wet bulb thermocouple 50 has shunted across its output terminals the high resistance 67. The positive sides of the two thermocouples are connected together and their negative sides are connected to the terminals of the relay 68. With this arrangement, the electro-motive forces produced by the two thermocouples oppose each other so that when the generated electro-motive forces are equal, there will be no current flowing through the relay 68, permitting its armature 69 to be pulled back by the spring 70 to rest against the contact 71 to close an electrical circuit through the solenoid 72 and the alternating current source 73, to close the valve 63, shutting off the supply of water from the tank 64 to the humidifier 65. When the dry bulb temperature is greater than the wet bulb temperature, there will be current flow through the relay 68, causing the armature 69 to pull up and break the circuit including the contact 71, solenoid 72, and alternating current source 73, causing the solenoid to open the valve 63, thus permitting the humidifier to be again operated. The resistances 66 and 67 may be adjusted to compensate for inequalities in the electro-motive forces produced by the thermocouples when the dew point is reached, and the adjustable spring 70 may be variably tensioned by the tensioning device 72 to cause the armature 69 of the relay 68 to respond to the desired value of current flowing through the relay.

Figs. 5 and 6 illustrate a desirable arrangement for maintaining and enclosing the wet bulb and dry bulb thermocouples described in connection with Figs. 3 and 4. Since it is desirable that the control apparatus, according to this invention, function to prevent the condensation of moisture on the window pane, it may be desirable under certain conditions to use for the surface cooling the air passing the wet bulb thermocouple a metal surface which will respond more quickly to outside changes of temperature than a window pane would. The metal surface 74 of Figs. 5 and 6 may be mounted in a portion of the window, and provided on its side contacting with the outside air, with the radiating fins 75 and on the side in contact with the air within the room, with the radiating fins 76 which are arranged as shown by Fig. 6 to form an extended path through which a sample of the moistened air within the room may be passed, to contact with a considerable portion of the cooled surface, so as to take on a wet bulb temperature proportional to the temperature of the surface 74. The outside fins 75, by providing maximum surface, cause the portion of the surface 74 extending into the room, to take on more quickly and more accurately the outside temperature. The fins 76 extending into the room give considerable surface against which the sample of air to actuate the wet bulb thermocouple may contact, to lower to a greater extent, its temperature. The inside fins 76 are enclosed by the insulating material 77 which acts both to prevent the warmer temperature of the air within the room from cooling the air passing between the fins 76, and also to prevent the metal surface from cooling the air within the room.

Referring now to Fig. 6, the fins 76 are arranged, as shown, to provide an elongated path for a sample of air to actuate the wet bulb thermocouple 50 which is mounted adjacent the exhaust portion 78 of the passageway. The propeller fan 79 is arranged over the exit 78 to draw a sample of air into the entrance 80 of the passage, which sample of air takes the path indicated by the arrows and passes over the wet bulb thermocouple 50 and exits from the fan 79, as shown. While the passageway of the sample of air actuating the thermocouple has been elongated to cause the air to pass across the metal surface 74 three times, obviously, the circulation channels may be greater in number or less in number, their number depending upon the circumstances surrounding a particular installation. It is believed that while a sample of air passing through the channels defined by the cooling fins 77, would not take on as low a temperature as the temperature of the air immediately adjacent the metal surface which would become condensed when its dew point is reached, the sample of air passing through the channels would unquestionably become cooled proportional to the temperature of the metal surface 74 which, in turn, is proportional to the outside temperature and to the temperature of the window pane and by adjustment of the resistances 53 and 56, as explained in connection with Fig. 3, the wet bulb and dry bulb thermocouples may be adjusted to give the desired electromotive forces when the air in contact with the cooled surface starts to precipitate moisture.

Another advantage of using the finned metal surface 74 to co-operate with the control apparatus is that this metal surface may be cooled to a lower temperature by the outside air, this due to the increased conduction rate of the metal and to the provision of the fins. The control apparatus, by using the metal surface, can, therefore, be made to shut off the humidifier at a temperature above that at which moisture would condense on the window pane, since the metal surface is cooled to a lower temperature.

The dry bulb thermocouple 52 may be mounted outside the window, may be mounted in contact with the window pane 51, or may be mounted within an opening in the window pane 51 to become responsive to the temperature of the window pane. Either of these methods would be satisfactory since the temperature of the window pane is proportional to the temperature of the outside air and adjustment may be made of the resistance 56, associated with the thermocouple 52, to compensate for the difference in temperature of the inside of the window pane and the temperature of the location of the thermocouple. It is only necessary that the thermocouple 52 generate electromotive forces proportional to the inside temperature of the window pane and this it would do in any of the locations mentioned above. A satisfactory location for the thermocouple 52 is shown by Fig. 5 where the metal surface 74 is drilled to receive the opening 81 in which the thermocouple 52 may be inserted. The thermocouple in this location would respond for all practical purposes to the temperature of the portion of the metal surface 74 against which the sample of air containing moisture contacts to actuate the wet bulb thermocouple 50.

The fan 79, shown by Fig. 6, may be actuated by a small electric motor. The metal surface, the insulating material 74, and the fan 79 may be made up as a small compact unit which may be quickly and easily associated with an ordinary window of a room, the air of which is to be humidified. The thermocouples may be enclosed within the unit. Since the unit requires in addition to the thermocouples, only a small fan, a galvanometer, and a motor operated valve for control of a humidifier, it is seen that it may be made up very cheaply. It may be housed in a decorative container occupying but little space; it is believed to require little or no attention, and to positively control the humidifier to prevent the condensation of moisture appearing on the window pane of the window with which it is associated.

While single thermocouples have been illustrated for actuating control apparatus, it is believed to be obvious that two or more thermocouples may be connected in series, in parallel, or in series-parallel to give sufficient power to actuate the control apparatus in the various embodiments of this invention.

Whereas the thermocouples 10, 23, and 52 in Figs. 1, 2, and 3 have been illustrated and described as being placed in the outdoor air and being exposed to outdoor temperatures, it should be understood that these thermocouples could be mounted in the window panes or in the metal observation surfaces when such surfaces are used. Obviously, observation of outdoor temperatures is unnecessary except as such temperatures cool the window pane or observation surface, since the moisture condenses only when the observation surface has been cooled to the dew point of the humidified air, and this cooling is done by the outside air, which is at a lower temperature than that within the room. Therefore, in this specification and claims, when reference is made to outdoor temperatures we are referring to the temperature of the observation surface which may be a window pane or which may be a metal surface, such as shown by Figs. 5 and 6.

It is also believed to be obvious that mechanical or electrical equivalents may be substituted for the electrical or mechanical devices utilized in the embodiments of this invention which have been described. For example, thermostats are mechanical equivalents for electrical thermocouples, and may be substituted for the thermocouples illustrated as actuating control apparatus according to this invention. Likewise, resistances which vary with temperature, such as those used in barometers and other similar devices, may be used with potential sources in substitution for the thermocouples illustrated in this disclosure.

Whereas one or more embodiments of the invention have been described for the purpose of illustration, it should be understood that the invention is not limited to the exact processes described as many departures may be made by those skilled in the art without departing from the spirit of the invention.

What is claim is:

1. Humidity control apparatus comprising means for supplying moisture to air within a room, an observation surface having a portion within the room and another portion exposed to outdoor temperatures, means responsive to the temperature of said observation surface, and means responsive to the wet bulb temperature of air immediately adjacent said observation surface, said means cooperating to decrease the amount of moisture supplied to the air within said room when said wet bulb temperature closely approaches the temperature of said observation surface.

2. Humidity control apparatus comprising means for supplying moisture to the air of a heated room, an observation surface within said room having a portion exposed to outdoor temperature, means responsive to the dry bulb temperature of the air within said room and to the temperature of said observation surface, for decreasing the supply of moisture to the room, when for a given temperature of said observation surface, the dry bulb temperature falls below a predetermined level.

3. Humidity control apparatus comprising means for supplying moisture to the air of a heated room, an observation surface within said room having a portion exposed to outdoor temperatures, and means responsive to the wet bulb temperature of the air within said room and to the temperature of said observation surface, for decreasing the supply of moisture to the room, when for a given temperature of said observation surface, the wet bulb temperature increases above a predetermined level.

4. Humidity control apparatus comprising means for supplying moisture to the air of a heated room, an observation surface within said room having a portion exposed to outdoor temperatures, means responsive to the dry bulb temperature of the air within said room and to the temperature of said observation surface for decreasing the supply of moisture to the room, when for a given temperature of said observation surface, the dry bulb temperature falls below a predetermined level, and means responsive to the wet bulb temperature of the air within said room and to the temperature of said observation surface, for decreasing the supply of moisture to the room, when for a given temperature of said observation surface, the wet bulb temperature of the air within the room rises above a predetermined level.

5. Humidity control apparatus comprising means for supplying moisture to the air of a heated room, an observation surface within said room and having a portion exposed to outdoor temperatures, and means for decreasing the supply of moisture to the air within said room when its dry bulb temperature is below a predetermined level and its wet bulb temperature is above a predetermined level for a given outdoor temperature, and for increasing the supply of moisture to the air within said room only when its dry bulb temperature is above a predetermined level and its wet bulb temperature is below a predetermined level for a given outside temperature.

6. The method of preventing condensation from moistened air within a heated room on a surface having a portion exposed to outdoor temperatures, which comprises, passing a sample of moistened air within the room closely in contact with said surface to cool said sample to a wet bulb temperature approaching the temperature of said surface, analyzing the wet bulb temperature of the sample of air and the temperature of the surface, and decreasing the supply of moisture to the air when the wet bulb temperature of the sample of air closely approaches the temperature of said observation surface.

7. Humidity control apparatus comprising means for supplying moisture to the heated air within a room, an observation surface within said room having a portion exposed to outdoor temperatures, means for cooling a sample of the humidified air from the room to a temperature approaching the temperature of said surface, and means for decreasing the supply of moisture to the air within the room when the wet bulb temperature of said sample of air closely approaches the temperature of said surface.

8. Humidity control apparatus comprising a humidifier for supplying moisture to the air of a heated room, an observation surface within said room having a portion exposed to outdoor temperatures, means responsive to the dry bulb temperature of the air within said room for translating changes in temperature into movement in apparatus, means responsive to the temperature of said observation surface for translating changes in temperature into movement of apparatus, and means actuated by said apparatus acting to decrease the amount of moisture supplied by said humidifier when for a given temperature of said observation surface the dry bulb temperature of the air falls below a predetermined level.

9. Humidity control apparatus comprising a humidifier for supplying moisture to the air of a heated room, an observation surface within said room having a portion exposed to outdoor temperatures, means responsive to the wet bulb temperature of the air within said room for translating changes in temperature into movement in apparatus, means responsive to the temperature of said observation surface for translating changes in temperature into movement of apparatus, and means actuated by said apparatus acting to increase the amount of moisture supplied by said humidifier when for a given temperature of said observation surface the wet bulb temperature of the air increases above a predetermined level.

10. Humidity control apparatus comprising a humidifier for supplying moisture to the air of a heated room, an observation surface within said room having a portion exposed to outdoor temperatures, means responsive to the dry bulb temperature of the air within said room and to the temperature of said observation surface for translating temperature changes into movement of apparatus, which, when for a given temperature of said observation surface the dry bulb temperature of the air falls below a predetermined level, acts to decrease the supply of moisture to the room, and means responsive to the wet bulb temperature of the air within the room and to the temperature of said observation surface acting to translate temperature changes into movement of apparatus which, when for a given temperature of said observation surface the wet bulb temperature of the air within the room rises above a predetermined level, acts to decrease the supply of moisture from said humidifier.

11. Humidity control apparatus comprising a humidifier for supplying moisture to the air of a heated room, an observation surface within said room having a portion exposed to outdoor temperatures, means responsive to the dry bulb temperature of the air within said room and to the temperature of said observation surface for translating temperature changes into movement of apparatus, which, when for a given temperature of said observation surface the dry bulb temperature of the air increases above a predetermined level, acts to increase the supply of moisture to the room, and means responsive to the wet bulb temperature of the air within the room and to the temperature of said observation surface acting to translate temperature changes to movement of apparatus which, when for a given temperature of said observation surface the wet bulb temperature of the air within the room falls below a predetermined level, acts to increase the supply of moisture from said humidifier.

12. Humidity control apparatus comprising a humidifier for supplying moisture to the air of a heated room, an observation surface within said room having a portion exposed to outdoor temperatures, an insulating enclosure adjacent a portion of said observation surface, means for passing a sample of the humidified air from the room through said enclosure to cool the sample to a temperature approaching the temperature of said surface, means responsive to the wet bulb temperature of said sample of air, means responsive to the temperature of that portion of said surface which contacts with the sample of said air, and control apparatus actuated by the two last mentioned means for decreasing the supply of moisture to the air within a room when said temperatures closely approach each other.

In testimony whereof we affix our signatures:

Signed at Hyde Park, in the county of Suffolk and State of Massachusetts, this 2nd day of May 1931.

SAMUEL M. ANDERSON.

Signed at New York City, in the county of New York, and State of New York, this 18th day of April, 1931.

ROBERT T. PALMER.